United States Patent [19]

Lindemann et al.

[11] 4,088,376

[45] May 9, 1978

[54] WHEEL ANTI-SKID BRAKE CONTROL SYSTEM FOR A ROAD VEHICLE

[75] Inventors: Klaus Lindemann, Hanover; Erich Reinecke, Beinhorn; Lutz Weise, Misburg, all of Germany

[73] Assignee: WABCO Westinghouse G.m.b.H., Hanover, Germany

[21] Appl. No.: 689,943

[22] Filed: May 25, 1976

[30] Foreign Application Priority Data

Jun. 3, 1975 Germany .............................. 2524427

[51] Int. Cl.² ............................................... B60T 8/10
[52] U.S. Cl. ...................................... 303/96; 303/111; 303/115; 303/118
[58] Field of Search ........................ 303/91, 93, 95, 96, 303/97, 98, 103, 109, 111, 115, 119, 7, 20; 188/181 C

[56] References Cited

U.S. PATENT DOCUMENTS

| | | | |
|---|---|---|---|
| 3,659,906 | 5/1972 | Horvath | 303/96 |
| 3,756,661 | 9/1973 | Michellone | 303/118 |
| 3,804,471 | 4/1974 | Fish | 303/7 |
| 3,980,346 | 9/1976 | Leiber | 303/115 |

FOREIGN PATENT DOCUMENTS 2,124,052 12/1971 Germany .............................. 303/96

*Primary Examiner*—Trygve M. Blix
*Assistant Examiner*—Reinhard J. Eisenzopf
*Attorney, Agent, or Firm*—R. W. McIntire, Jr.

[57] ABSTRACT

A wheel anti-skid brake control system for an automotive type vehicle in which diagonally opposed wheels on different axles of the vehicle are provided with a sensor device whose output signals represent different dynamic wheel behavior conditions. An electropneumatic modulator valve is operative in a common line via which fluid pressure is delivered to each brake cylinder device of an axle or in a separate line connected directly to each individual brake cylinder device of the axle to influence the brake pressure delivered to each brake cylinder via an operator's control valve device in accordance with the output signals of the sensor device of one wheel of the axle, as monitored by an evaluation circuit to which the modulator valve or valves of the axle are operatively connected.

2 Claims, 6 Drawing Figures

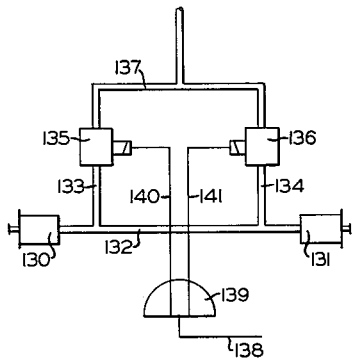

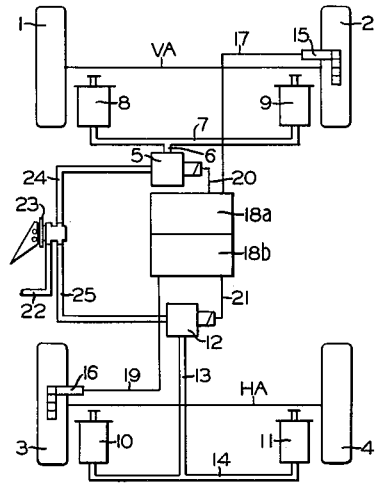

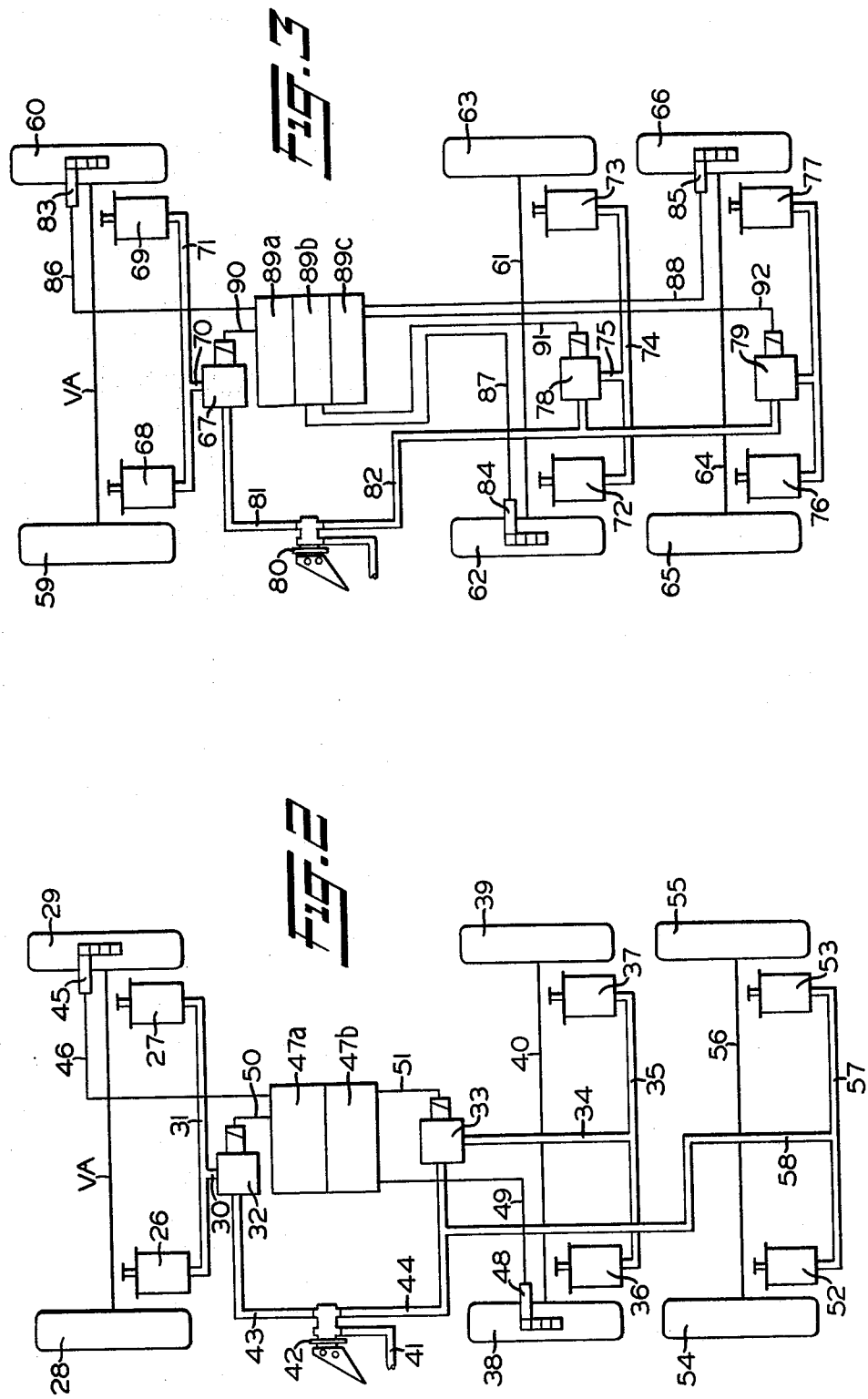

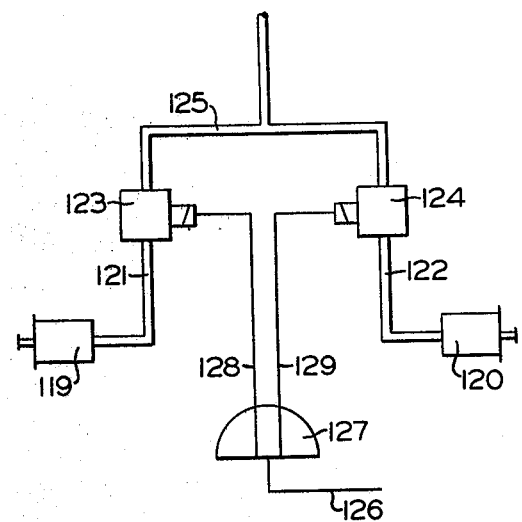
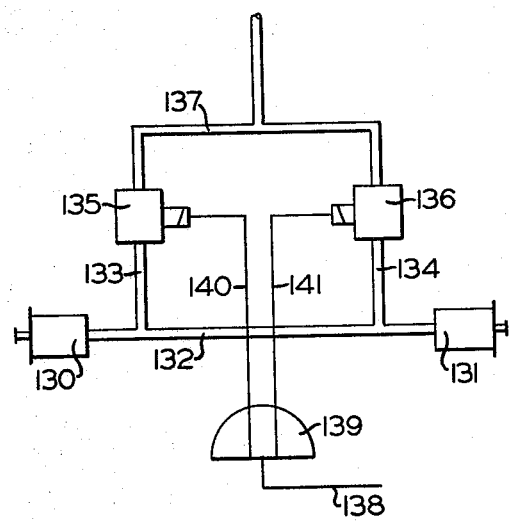

WHEEL ANTI-SKID BRAKE CONTROL SYSTEM FOR A ROAD VEHICLE

BACKGROUND OF THE INVENTION

The invention concerns a wheel anti-skid brake control system for fluid pressure brakes, particularly for motor vehicles, wherein a sensor device that scans and evaluates the dynamic wheel behavior during braking is assigned to at least one wheel of an axle, and its output signals influence the brake pressure at both wheels of a common axle via an electronic evaluating circuit.

Known wheel anit-skid brake systems are characterized by the fact that the front wheels of a vehicle have modulator devices which alter the brake pressure in the wheel cylinders during braking, depending on the rotational behavior of the front wheels. The brake lines from these modulator devices to the wheel brake cylinders of the front wheels are connected with the brake cylinders of the back wheels via auxiliary brake lines. In this way, the braking force is concurrently modulated on all braking wheels of the vehicle substantially the same.

In vehicles with a very short wheel base, such a brake pressure control system can adequately control the pressure. However, this system cannot be used in vehicles with a long wheel base, particularly multi-axle vehicles, because in the case of compressed air brake systems such as those used in commerical vehicles, for example, long brake lines do not permit rapid adjustment of the brake pressure, nor can the axle load fluctuations resulting from varying load conditions be accounted for. Another disadvantage of this system is that, due to the arrangement of the devices that control the brake pressure according to the rotational behavior only at the front wheels of the vehicles, the rotational behavior of the rear wheels, which can briefly encounter a different coefficient of friction than the front wheels, is not taken into consideration. For example, when the friction is high at the front wheels and low at the back wheels, the back wheels are overbraked and momentarily locked, which makes the vehicle unstable. On the other hand, when the friction is low at the front wheels and high at the back wheels, only a low brake pressure is sent into the brake cylinders of the front wheels and hence, into those of the rear wheels, so that the total braking force is small, and the braking distance is needlessly increased.

It is also conceivable, for example, that sensor devices are arranged on diagonally opposed wheels of different axles of a vehicle and their output signals influence the brake pressure at all braking wheels of the vehicle via a single evaluating circuit and a modulator valve unit, with the output signals of both sensor devices being determined by an evaluating circuit for the purpose of brake control, such that only one output signal is used at any given time for control. However, such a wheel anti-skid brake control system has the disadvantage that the output signal of the signal device of the wheel that first indicates a tendency to lock determines the brake pressure of all the wheels. For example, when the right front wheel of a heavily loaded vehicle encounters less friction on the road than the left rear wheel, the brake pressure is reduced at all wheels that are braked. Thus, maximum utilization of the available braking force at the wheels encountering the higher friction is prevented, the result being a longer braking distance. A load modified brake force or anti-skid brake control that accounts for the varying axle loads is impossible with such a system unless expensive auxiliary equipment is used.

SUMMARY OF THE INVENTION

The objective of the invention is to provide a wheel anti-skid brake control system without the aforementioned drawbacks of known systems, wherein the brake pressure at the wheels of each axle of a vehicle can be controlled according to the load conditions of the vehicle and the friction value encountered by the wheels of each axle.

The special advantage of the anti-lock control system of the invention over the known braking system is that the brake pressure common to two wheels of an axle is determined in accordance with the output signals of the wheel behavior sensor device of one wheel of this axle via an electronic evaluating circuit, with the wheel behavior sensor devices being arranged on diagonally opposed wheels of two vehicle axles, so that, for example, the different load of the front and rear axle or axles, and the different frictional values possibly occuring at the wheels of the front and rear axle of a tractor trailer rig are taken into consideration during load modified brake control and wheel anti-skid brake control.

The object and other advantages of the invention will become apparent from the following explanation based on the several drawings in which:

FIG. 1 is a diagrammatic of the brake system on a dual-axle vehicle in which the dynamic behavior characteristics of diagonally opposed wheels of separate axles of the vehicle are sensed, and the common brake pressure delivered to the wheels on each axle is influenced by the wheel anti-skid brake control.

FIG. 2 is a diagrammatic of the brake system of a triple-axle vehicle in which the dynamic behavior characteristics of the right wheel of the first axle and left wheel of the second axle are sensed, with both wheels of each axle being controlled as in the FIG. 1 showing, while the pressure delivered to brake cylinders of the wheels of the third axle is isolated from the wheel anti-skid brake control.

FIG. 3 is a diagrammatic of the brake system of a triple-axle vehicle in which the diagonally opposed wheels of the adjacent axles are sensed, and the brake pressure common to the wheels of each axle is influenced by the anti-wheel skid brake control.

FIG. 5 is a diagrammatic of a brake system similar to that of FIG. 4, but arranged to include an OR gate via which the electro-pneumatic control valve units of each wheel of a given axle are controlled by the wheel evaluation circuit.

FIG. 6 shows an arrangement similar to the FIG. 5 showing, but further modified to prevent disproportionate brake forces from developing in the event of an electrical malfunction of one of the electro-pneumatic control valve devices.

DESCRIPTION AND OPERATION

Figure 1:
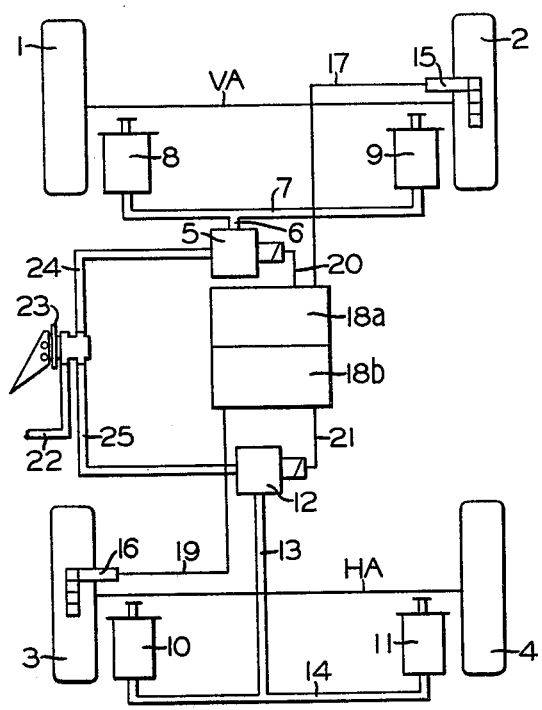

FIG. 1 shows the wheels 1, 2, 3 and 4 of a dual-axle road vehicle. Brake cylinders 8 and 9 of the wheels 1, 2 of the front axle VA are directly connected with each other by a brake line 7. A brake line 6 is connected to a brake line 7, and connects the latter to the delivery port of an electro-pneumatic modulator valve unit 5. Brake cylinders 10 and 11 of the wheels 3, 4 of the rear axle HA of the vehicle are also connected with each other by a brake line 14. A brake line 13 connected to this brake line 14 is connected to the delivery port of an electro-pneumatic modulator valve unit 12. Sensors 15 and 16 are arranged at the right wheel 2 of the front axle VA and the left wheel 3 of the rear axle HA for monitoring the dynamic behavior of the respective wheels. An electrical line 17 leads from sensor 15 to an electronic evaluating circuit 18a; and electrical line 19 passes from sensor 16 to an electronic evaluating circuit 18b. These evaluating circuit contain logic arranged to recognize certain dynamic conditions of the wheels in accordance with the wheel behavior signals from the wheel sensors. The output of the electronic evaluating circuit 18a is connected with the modulator valve unit 5 via an electric control line 20, and the output of the electronic evaluating circuit 18b is connected with the control valve unit 12 via an electric control line 21. A pressure line 22 passes from a pressurized container (not shown) to a pedal-type operator's control valve 23, which connects the input of the control valve unit 5 with the pressurized container via a pressure line 24 and the pressure line 22. The pressurized container is also connected with the input of the control valve unit 12 via pressure lines 22 and 25 and a pedal-type operator's control valve 23.

When braking is initiated by the pedal-type valve 23, compressed air flows through pressure line 22, and the pedal-type valve 23, pressure line 24, and the modulator valve unit 5 and into the brake cylinders of the wheels 1, 2 of the front axle VA. The sensor 15 of wheel 2 detects the rotational behavior of the wheel 2 during the braking process, and sends a signal to the electronic evaluating circuit 18a via the electric line 17 when the wheel 2 shows a tendency to lock. Electronic evaluating circuit 18a responds to this signal by passing an output signal via electric control line 20 to the control valve unit 5, which blocks further compressed air supply to the brake cylinders to maintain constant pressure therein. This limits the braking force exerted by the wheel brake cylinders until wheel 2 is able to regain rotation. When this occurs, the compressed air supply is restored to increase the brake pressure at the brake cylinders 8 and 9 of the wheels 1 and 2 of the front axle VA. In the same way, the brake pressure at the cylinders 10 and 11 of the wheels 3 and 4 of the rear axles HA is concurrently influenced by the output signals of the sensor 16 of the left wheel 3 of the rear axle HA via the electronic evaluating circuit 18b and the modulator valve unit 12.

The example corresponding to FIG. 2 concerns a three-axle vehicle, in which only the pressure at the wheels of two axles is influenced by the wheel skid control system. Brake cylinders 26 and 27 of the wheels 28 and 29 of the front axle VA of a triple-axle vehicle are connected directly with each other via a brake line 31. A brake line 30 connected to the brake line 31 is connected to the delivery port of an electro-pneumatic modulator valve unit 32. A connection is made between brake cylinders 36, 37 and the delivery port of an electro-pneumatic modulator valve unit 33 via a brake line 35 connecting brake cylinders 36 and 37 of the wheels 38, 39, and a branch line 34 of brake line 35. A pressure line 41 leads from a pressurized supply container (not shown) to an operator's pedal-type control valve 42, which is connected to the supply port of the modulator valve unit 32 by a pressure line 43 and is also connected to the supply port of control valve unit 33 of the wheels of a second axle 40 by the pressure line 41. A sensor 45 is arranged on the right wheel 29 of the front axle VA, and its output signals travel over an electrical line 46 to an input of electronic evaluating circuit 47a. The output signals of a sensor 48 arranged on the left wheel 38 of the second axle 40 are connected via electrical line 49 to an input of an electronic evaluating circuit 47b. The output of the evaluating circuit 47a is connected to the modulator valve unit 32 by an electric control line 50, while an electric control line 51 leads from the output of the electronic evaluating circuit 47b to the control valve unit 33. Brake cylinders 52 and 53 of wheels 54, 55 of a third vehicle axle 56 are directly connected to the pressurized supply container via brake lines 57, 58, 44 and the pedal-type valve 42. There is no control valve unit assigned to wheel brake cylinders 52 and 53 in this example.

The brake pressure at the brake cylinders of the wheels of the first axle and the second axle is influenced by the wheel skid control system in the same way as describedin the example in accordance with FIG. 1, while the brake cylinder pressure of the wheels of the third axle is controlled only by the operator's control valve 42.

FIG. 3 shows an anti-skid brake control system that influences the brake pressure on all wheels of a three-axle vehicle. The figure shows the wheels 59, 60 of a first axle VA, wheels 62, 63 of a second axle 61, and wheels 65, 66 of a third axle 64. An electro-pneumatic modulator valve unit 67 is connected by a brake line 70 to a brake line 71, which directly connects brake cylinders 68, 69 of the wheels 59, 60 of the front axle VA with each other. Similarly, a brake line 75 connects an electro-pneumatic modulator valve unit 78 to a brake line 74, which directly connects the brake cyclinders 72 and 73 of the wheels of axle 61 together. Brake cylinders 76 and 77 of the wheels 65 and 66 of third axle 64 are connected together via a brake line and connected to a modulator valve unit 79 via a branch line leading from the brake line connecting the two brake cylinders 76, 77.

Pressure lines 81, 82 lead from an operator's pedal-type control valve 80 to the control valve units 67, 78 and 79. Pedal-type valve 80 is connected to a pressurized container (not shown). The sensors 83, 84 and 85 are assigned to the right wheel 60 of the first axle VA, the left wheel 62 of the second axle 61, and the right wheel 66 of the third axle 64 respectively, and an electrical line 86, 87 and 88 leads from each sensor 83, 84, 85 to an input of electronic evaluating circuit 89a, 89b, and 89c. The outputs of the electronic evaluating circuits 89a, 89b, 89c are connected to the control valve units 67, 78, and 79 via electric control line 90, 91, 92.

During braking, the rotational behavior of the sensed wheel of each axle is monitored by the appropriate evaluating circuit. When a sensed wheel exhibits a tendency to lock, a signal is sent from the appropriate evaluating circuit to the modulator valve units, and the brake pressure at both the sensed wheel and the unsensed wheel of the same axle, is influenced by the wheel skid control system as a whole.

From the foregoing arrangements illustrating a skid control system in accordance with the present invention, wherein there is provided a sensor on one wheel of each axle and the common control of the brake pressure on the cylinders of those wheels of this axle as a function of the output signals of the sensor of one of these wheels, coefficients of friction possible differing between the wheels of all axles of a vehicle are accounted for, so that the utilization of the brake forces is optimized.

Figure 4:
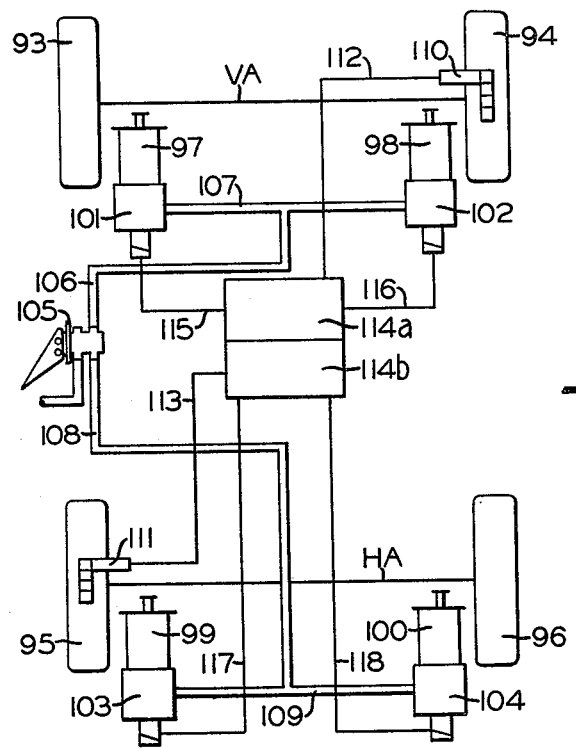
FIG. 4 is a diagrammatic of the brake system of a dual-axle vehicle similar to the FIG. 1 showing except that each wheel brake pressure is provided with a separate control valve unit.

FIG. 4 shows an anti-locking control system for a dual-axle vehicle, in which electro-pneumatic modulator valve units are assigned to each wheel of an axle, and the modulator valve units of two wheels of an axle are controlled by the output signals of a sensor arranged at one wheel of this axle via an electronic evaluating circuit. Brake cylinders 97, 98, 99, and 100 are arranged at the wheels 93 and 94 of the front axle VA of the vehicle, and on the wheels 95 and 96 of the rear axle HA, and are connected to the control valve units 101, 102, 103 and 104. A pedal-type operator's control valve 105 is connected both with a pressurized container (not shown) and via pressure lines 106, 107, 108 and 109 to the modulator valve units 101, 102, 103, 104. Electric line 112 and 113 lead from sensors 110 and 111 arranged on the right wheel 94 of the front axle VA and on the left wheel 95 of the rear axle HA to an appropriate electronic evaluating circuit 114a, 114b. Two outputs of the electronic evaluating circuit 114a are connected to modulator valve units 101, 102 via electric control lines 115, 116, while two outputs of circuit 114b are connected to the modulator valve units 103 and 104 by electronic control lines 117, 118.

If the right wheel 94 of the front axle VA exhibits a marked tendency to lock-up during braking, a signal is sent from the sensor 110 of this wheel 94 to the electronic evaluating circuit 114a whose output signals reach the control valve units 101 and 102, which control the brake pressure in the brake cylinders 97 and 98 of the wheels 93 and 94 of the front axle VA. The brake pressure in the brake cylinders 99 and 100 of the wheels 95, 96 of the rear axle HA is controlled by the output signals of the wheel sensor 111 of the left wheel 95 to which electronic evaluating circuit 114b responds to effect operation of control valve units 103 and 104, both of which are subject to the output signals of the electronic evaluating circuit 114b.

In accordance with the various examples of the invention described in the foregoing, the brake pressure at any two wheels of an axle is influenced by the output signals of only one sensor assigned to one of these wheels via an electronic evaluating circuit and one or two control valve units in order to increase the safety of the anti-locking control circuit according to the invention. In the event of a malfunction or disturbance in a control circuit, such as the example shown in FIG. 4, which in this case always consists of a control valve unit having an electric control line between the control valve unit and electronic evaluating circuit, and a pressure line leading to the modulator valve unit, by means of an additional pressurized connection of the two wheel brake cylinders of the wheels of one axle and/or the control valve units, it is possible to continue to maintain the breaking pressure on a wheel by means of including an additional OR gate in the electric control line which connects the electro-pneumatic modulator valve units to the electronic evaluating circuit.

Two possible circuits are shown in FIGS. 5 and 6 utilizing an additional OR gate, as above mentioned. In FIG. 5, brake cylinders 119 and 120 are connected to a source of fluid pressure via pressure lines 121, 122, each of which leads to a respective modulator valve unit 123 and 124. Another pressure line 125 connecting the delivery port of modulator valve units 123 and 124 is also connected via a branch line to the source of fluid pressure. An electric control line 126 is connected from an electronic evaluating circuit (not shown) to an OR gate 127, whose two outputs are connected with the control valve units 123, 124 via electric lines 128 and 129.

If, for example, a short circuit occurs in the control valve 124, or if the electric line 129 leading from OR gate 127 to the modulator valve unit 124 breaks, the brake cylinder 120 receives full pressure due to the modulator valve design, which provides for opening of the inlet valve in such cases, thereby creating the possibility of wheel lock-up.

However, since the modulator valve unit 123 is connected in parallel with modulator valve 124, via the second output of OR gate 127 and electric line 128, the brake pressure at the wheel brake cylinder 119 is still controlled.

FIG. 6 shows two wheel brake cylinders 130 and 131 connected directly with each other by a pressure line 132. Two pressure lines 133 and 134 branch off the pressure line 132 and are connected to the outlet of a modulator valve unit 135, and a modulator valve unit 136, respectively. The delivery port of modulator valve units 135 and 136 is connected with a source (not shown) of fluid pressure via a common pressure line 137.

An electronic evaluating circuit (not shown) is connected with the control valve units 135 and 136 by an electric control line 138 and an OR gate 139 and by two electric lines 140, 141 leading from the OR gate outputs to the modulator valve units 135 and 136.

Due to the arrangement of the pressure line directly connecting the two wheel brake cylinders 130 and 131, the pressure is always sent into the two wheel brake cylinders 130 and 131 by the first control valve unit to respond whenever modulator valve units 135 and 136 respond at different times, or when one fails to respond so that the braking force is uniform at both wheels of an axle.

Having now described the invention, what we claim as new and desire to secure by Letters Patent, is:

1. A wheel anti-skid brake control system for a road vehicle having at least two axles with wheels at opposite sides thereof, each wheel being provided with a fluid pressure operative brake cylinder device to which a source of fluid pressure is connected via an operator's control valve device, said system comprising:
   (a) sensor means for providing output signals in accordance with different dynamic wheel behavior conditions of one wheel of each of said at least two axles of said vehicle, said one wheel of one axle being diagonally opposed to said one wheel of the other axle;
   (b) modulating valve means associated with each said brake cylinder device for influencing the fluid pressure connected thereto via said operator's control valve device;
   (c) evaluation means for each axle subject to said output signals representing the behavior conditions of said one wheel of a respective one of said axles for effecting operation of each said modulating valve means associated with said respective one of said axles; and
   (d) means for connecting the fluid pressure at one of said brake cylinder devices of a respective one of said axles with the other brake cylinder device thereof.

2. A wheel anti-skid brake control system, as recited in claim 1, further comprising means via which said individual valve devices are operated in parallel responsive to operation of said evaluation means.

* * * * *